United States Patent [19]
Devon et al.

[11] Patent Number: 5,634,074
[45] Date of Patent: May 27, 1997

[54] SERIAL I/O DEVICE IDENTIFIES ITSELF TO A COMPUTER THROUGH A SERIAL INTERFACE DURING POWER ON RESET THEN IT IS BEING CONFIGURED BY THE COMPUTER

[75] Inventors: Mark Devon; John Lynch, both of San Jose; James B. Nichols, San Mateo, all of Calif.

[73] Assignee: Apple Computer, Inc., Cupertino, Calif.

[21] Appl. No.: 59,598

[22] Filed: May 7, 1993

[51] Int. Cl.⁶ .................................................. G06F 13/00
[52] U.S. Cl. .................... 395/828; 395/823; 395/829; 395/830; 395/285
[58] Field of Search ............................. 395/275, 325, 395/285, 830, 828, 823, 829; 370/60, 56; 340/825.52; 364/514

[56] References Cited

U.S. PATENT DOCUMENTS

| | | | |
|---|---|---|---|
| 4,660,141 | 4/1987 | Ceccon et al. | 395/275 |
| 4,689,786 | 8/1987 | Sidhu et al. | 370/94 |
| 4,750,136 | 6/1988 | Arpin et al. | 364/514 |
| 4,773,005 | 9/1988 | Sullivan | 395/275 |
| 4,787,028 | 11/1988 | Finfrock et al. | 395/285 |
| 5,038,320 | 8/1991 | Heath et al. | 395/830 |
| 5,204,669 | 4/1993 | Dorfe et al. | 340/825.52 |
| 5,226,040 | 7/1993 | Noble, III et al. | 370/56 |
| 5,379,296 | 1/1995 | Johnson et al. | 370/60 |
| 5,452,420 | 9/1995 | Engdahl et al. | 395/285 |

FOREIGN PATENT DOCUMENTS

| | | |
|---|---|---|
| 0410314 | 1/1991 | European Pat. Off. . |
| 2-113742 | 7/1990 | Japan . |
| 2255877 | 11/1992 | United Kingdom . |
| WO8701484 | 3/1987 | WIPO . |

OTHER PUBLICATIONS

Comer, Douglas E., Internetworking with TCP/IP vol. I, 1991, pp. 26–27, 80, 95, and 123–124.

Primary Examiner—Thomas C. Lee
Assistant Examiner—Le Hien Luu
Attorney, Agent, or Firm—Burns, Doane, Swecker & Mathis, L.L.P.

[57] ABSTRACT

A self-configuring startup procedure for communications devices, including telecommunications adapters, provides unambiguous identification of the telecommunications adapter, or other communications device, connected to a serial port. The procedure does not interfere with the operation of other existing I/O devices that might be connected to the serial port, such as network, MIDI, or other serial I/O devices. The I/O device is connected to a computer through a serial interface and a serial link. When the I/O device exits a reset state, the I/O device sends across the serial link to the computer a "beacon" signal identifying the I/O device. In particular, during the beacon phase, the I/O device communicates identification and configuration parameters. Preferably, the beacon phase may be instigated by the computer using the same serial-link communications channel.

19 Claims, 4 Drawing Sheets

SERIAL I/O DEVICE IDENTIFIES ITSELF TO A COMPUTER THROUGH A SERIAL INTERFACE DURING POWER ON RESET THEN IT IS BEING CONFIGURED BY THE COMPUTER

BACKGROUND OF THE INVENTION

1. Field of the Invention

The present invention relates to serial dam communications and more particularly to identification and configuration of serially-connected communications devices.

2. State of the Art

In computer design and engineering, whereas technical benchmarks were once the prime differentiator among competing products, more recently, ease of use has assumed singular importance. Considerable research and development effort has been focused on the human engineering aspects of computers, particularly the user interface. Graphical user interfaces have now become the de facto industry standard.

Despite these developments, telecommunications has remained, at least to the uninitiated, a daunting aspect of computing. To the novice computer user, the numerous specifications required to establish a high-speed connection present an often insuperable challenge. At the same time, the range of available telecommunications services is rapidly expanding, offering, for example, seamless remote network access, online services with audio feedback, and transparent reception of faxes and voice messages. In order to provide easy, affordable access to these and other emerging telecommunications services, a need exists for high-performance, low-cost telecommunications platforms that support global fax, data and voice data streams in an intuitive way.

In the past, in order to enable a computer to operate with a particular communications device ("telecom adapter") attached to the serial port, the computer user has had to identify to the computer, and then configure, the communications device. If the user did not configure the telecom adapter properly, communications could not be established. Also, dedicated hardware circuitry has typically been required to exchange device identification between the telecom adapter and the host computer during the configuration phase. This special-purpose configuration hardware (including, for example, DIP switches, ID ROMs or ID wheels, and jumpers for circuit boards) contributes to the cost of the telecom adapter.

SUMMARY OF THE INVENTION

The present invention, generally speaking, provides a self-configuring startup procedure for communications devices, including telecommunications adapters. The procedure provides unambiguous identification of the telecommunications adapter, or other communications device, connected to a serial port, and does not interfere with the operation of other existing I/O devices that might be connected to the serial port, such as network, MIDI, or other serial I/O devices.

In accordance with one embodiment of the invention, an I/O device is connected to a computer through a serial interface and a serial link. When the I/O device exits a reset state, the I/O device sends across the serial link to the computer a "beacon" signal identifying the I/O device. In particular, during the beacon phase, the I/O device communicates identification and configuration parameters. Preferably, the beacon phase may be instigated by the computer using the same serial-link communications channel.

BRIEF DESCRIPTION OF THE DRAWINGS

The invention may be further understood from the following description in conjunction with the appended drawings. In the drawings.

DETAILED DESCRIPTION OF THE PREFERRED EMBODIMENTS

Figure 1:
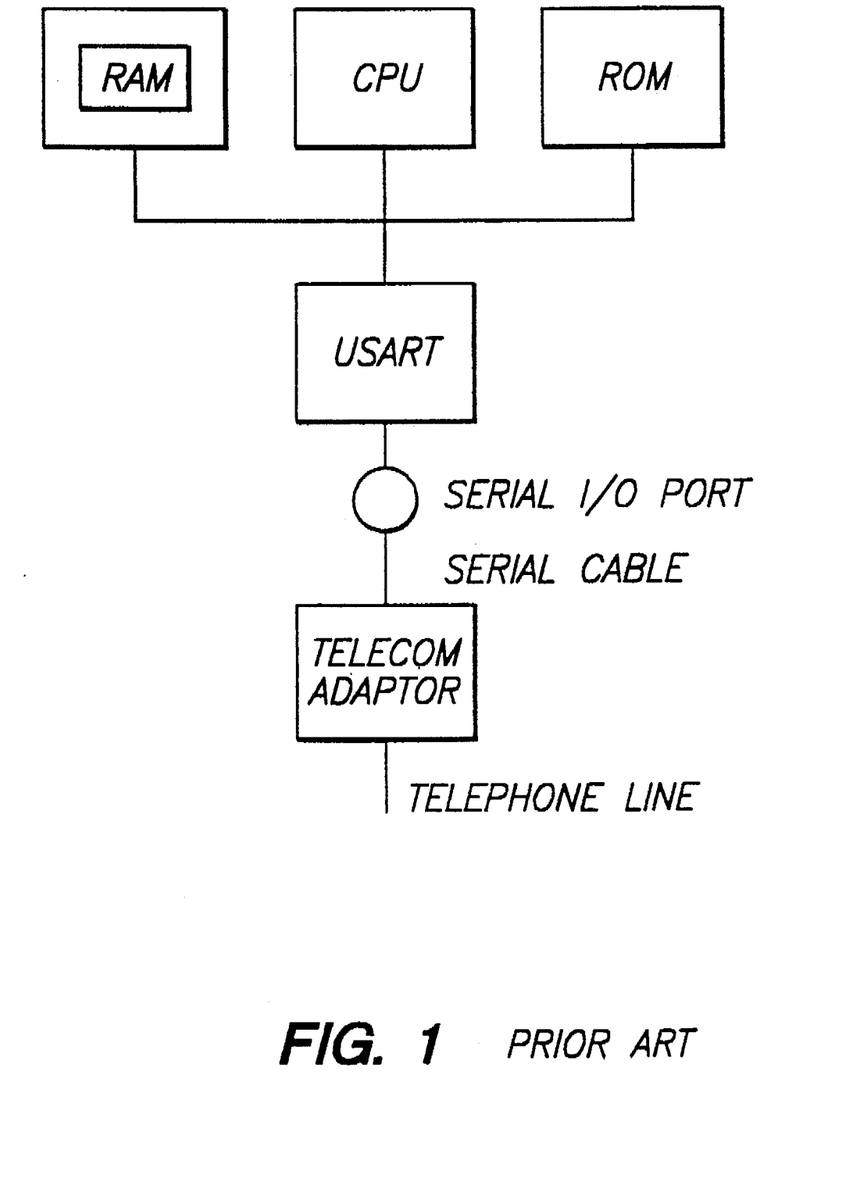
FIG. 1 is a simplified block diagram of a computer system in which the present invention may be used.

The computer system of FIG. 1 is exemplary of a wide variety of computer systems, both large and small, in which serially-connected communications devices may be found and in which the present self-configuring startup procedure may be used to advantage. An address bus and a data bus connect a central processing unit (CPU) to read-only memory (ROM), and, through bus transceivers, to random-access memory (RAM) and to a UART (universal asynchronous receiver transmitter) or a USART (universal synchronous/asynchronous receiver transmitter) that provides an interface to the serial I/O port(s). A telecom adapter is shown connected to the serial port.

Figure 2A:
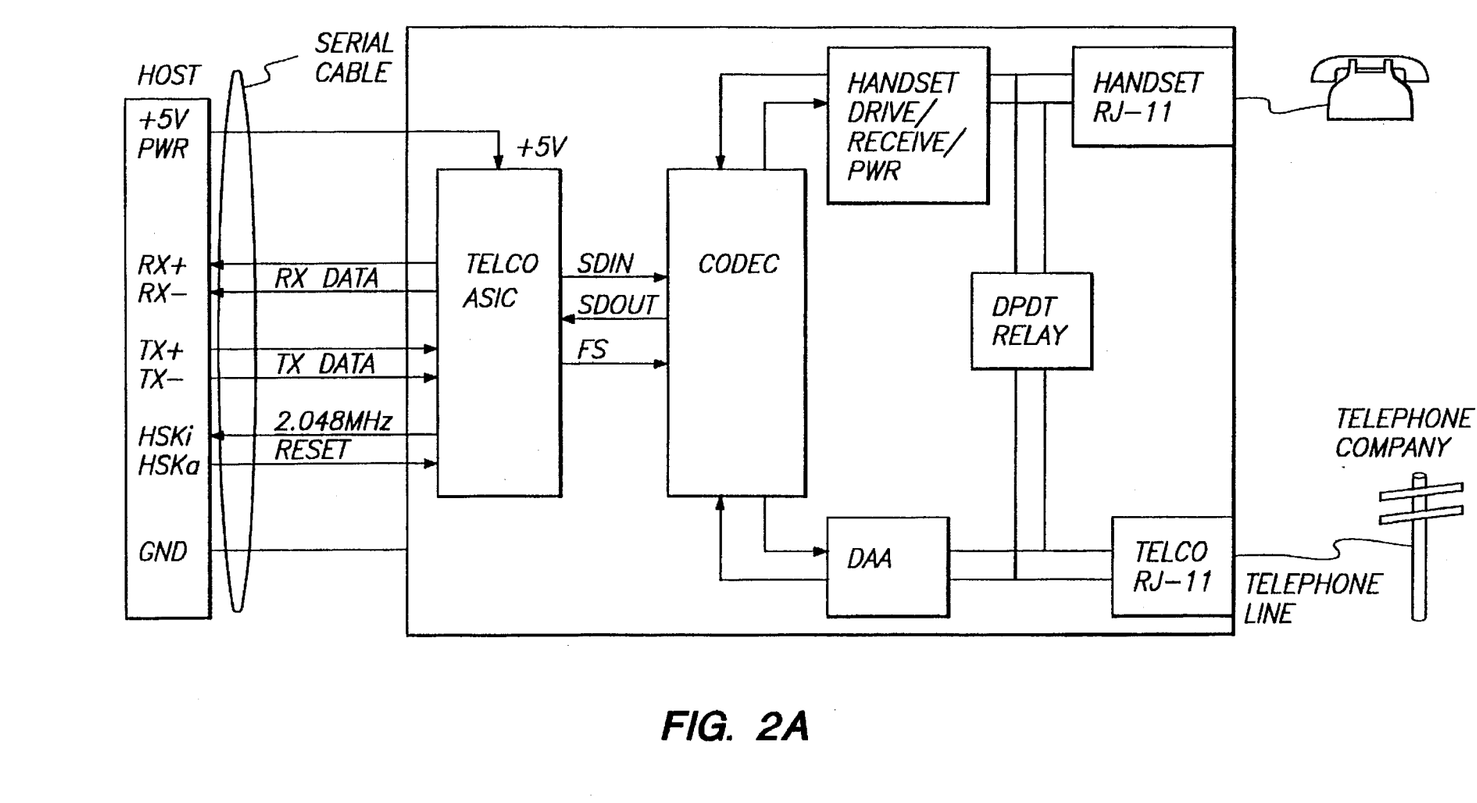
FIG. 2A and 2B are block diagrams of examples of possible communications devices that may be used in the computer system of FIG. 1.

Referring to FIG. 2A, the physical interface through which the telecom adapter is connected to the host computer system may be, for example, a mini-DIN 8 connector connected to a serial cable. The serial port conforms to the EIA (Electronics Industry Association) standard RS-422. Differential transmission is used to provide greater immunity to noise and interference, increasing reliability over longer distances. Two receive signals, RX+ and RX− are modulated against one another and input to the serial port. Two transmit signals, TX+ and TX−, are modulated against one another and input to the telecom adapter. Power (+5 V) and Ground (GND) are provided from the serial port to the telecom adapter. The telecom adapter provides a clock signal (HSKi) having a frequency of, for example, 2.048 Mhz to the serial port. The host computer provides to the telecom adapter a control signal on a handshake output line, often referred to as HSKo or DTR. This control signal can be used to prompt the device to send its beacon signal. Alternatively, a byte or sequence of data bytes may be sent from the computer to the I/O device to prompt the device to send its beacon signal.

The telecom adapter may be an analog ("plain-old telephone service," or POTS) telecom adapter. In the analog telecom adapter, an application-specific integrated circuit (ASIC) realizes a state machine that exchanges identification and configuration information with the host computer during the self-configuring startup procedure, or beacon phase. Alternatively, the telecom adapter may be an Integrated Services Digital Network (ISDN) digital adapter, or may be of any one of numerous other types.

The beacon phase is entered upon power up, or may be forced by the computer's holding the Reset (HSKo) line active (high) for more than 15 us. The computer will never hold the HSKo line active for longer than 50 ms. This action prevents other devices that might at various times be connected to the serial port from possibly going active for a long period of time. Some serial devices interpret the HSKo signal as a DTR (Data Terminal Ready) signal and may in response perform automatic operations when the device goes active, such as dial a phone number. Limiting the HSKo active period to 50 ms prevents these problems.

Figure 3A:
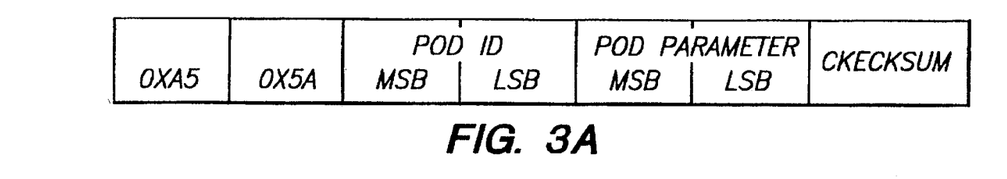
FIG. 3A is a diagram of a beacon signal sent by the communications device to the computer system.
Figure 5:
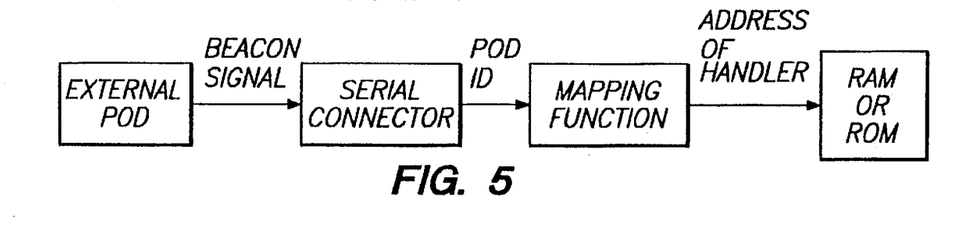
FIG. 5 is a block diagram illustrating mapping of a pod ID to a software pod handler.

When the telecom adapter (or telecommunications "pod") powers up or receives a reset pulse, it will send to the host computer a beacon signal that is used to identity the type of telecom adapter and to synchronize the computer and the telecom adapter. Referring to FIG. 3A, the beacon signal consists of a seven-byte sequence, the first two bytes of which are the pattern 0×A5, 0×5A. The following two bytes form a Pod ID, a 16-bit quantity identifying the type of serial device which is attached. The Pod ID can be mapped to a specific Pod Handler software module used to handle communications with this type of device, allowing the appropriate pod handler to be identified and loaded in the computer as illustrated in FIG. 5. That is, the pod sends its beacon signal to the serial connector of the computer, which extracts from the beacon signal the Pod ID. The Pod ID is then applied to a mapping function to obtain the address in RAM or ROM of the pod handler routine.

The Pod ID is divided into two fields, a family ID in the high byte and a pod-specific ID in the low byte. Examples of family IDs are:

| Family Type | Family ID |
|---|---|
| Telephony | 0 × 00 |
| Digital Image | 0 × 01 |
| LANs | 0 × 02 |

Examples of specific telephony pod IDs are as follows:

| Pod Type | Pod ID |
|---|---|
| POTS | 0 × 01 |
| ISDN | 0 × 02 |

The Pod Parameter bytes are used to relay basic information, such as the hardware revision of the pod, to the software pod handler. These bytes are therefore a local matter to the pod. The checksum is calculated on all bytes in the beacon, i.e. 0×A5+0×5A+Pod ID MSB+Pod ID LSB. Carry is ignored; i.e., the addition is simply performed modulo 0×100.

The beacon signal is always sent with asynchronous framing: 1 start bit, 1 stop bit and no parity. It can either be sent at relatively low predetermined speed (e.g., 9600 baud) or at the pod clock rate. In non-DMA computer systems in which the SCC is serviced entirely by the CPU, beacon bytes should be sent no more frequently than 1 byte per millisecond to avoid overrunning the computer's receiver.

In a preferred embodiment, the beacon signal is sent only once. The beacon signal's first byte should be sent no sooner than 10 ms after the active-to-inactive transition on the HSKo line in order to allow setup time for the computer's CPU or IOP. The beacon signal should be completed within 200 ms after the active-to-inactive transition in order to allow communications to proceed.

Figure 2B:
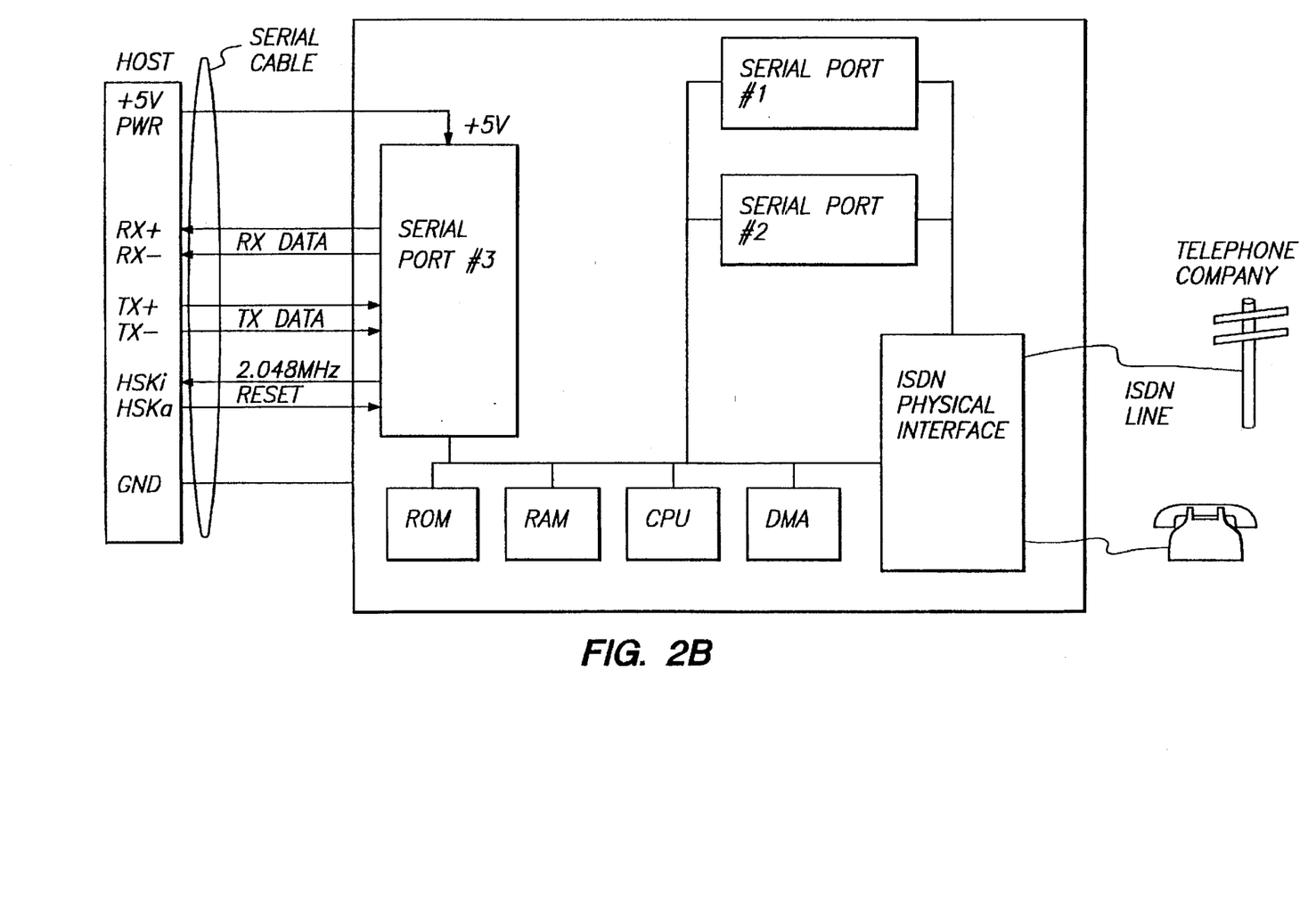

The present self-configuring start-up sequence provides for two alternative interface modes, DMA receive mode and polled received mode. DMA received mode uses a TDM (time-division-multiplex) interface, whereas polled received mode uses a packetized interface. The POTS pod of FIG. 2A, for example, might only have the capability passing along to the computer a stream of digitized samples. The ISDN pod of FIG. 2B, on the other hand, might have the capability of interfacing to the host computer using High-Level Datalink control (HDLC) signalling.

Figure 3B:
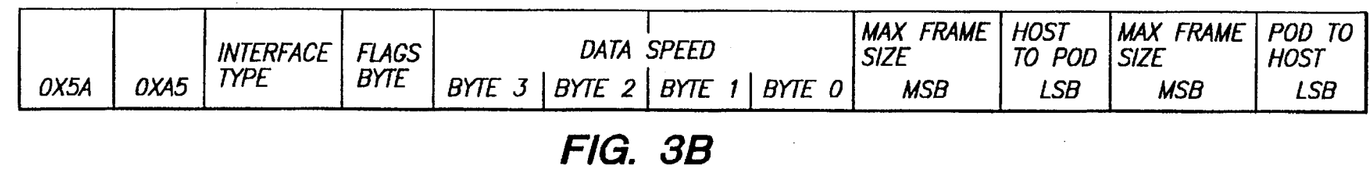
FIG. 3B is a diagram of a beacon acknowledge signal sent by the computer system to the communications device.

Once the computer has received the beacon signal, it sends to the pod a beacon acknowledge sequence. In the case of the packetized interface, the beacon acknowledge sequence prepares the pod to begin receiving packets. The beacon acknowledge sequence consists of twelve bytes as shown in FIG. 3B. The first two bytes consist of pattern 0×5A, 0×A5. The Interface Type byte allows a single pod to support different interface types. For example, the Interface Type byte might assume one value for Macintosh computers and one or more others values for IBM-compatible computers.

The Maximum Data Speed parameter is a 32 bit quantity that indicates the maximum data speed that the computer can support. If the pod can support a data rate less than or equal to this value, then it will respond with the same value in its beacon completion sequence (FIG. 3C), described below. If the pod only supports clock rates greater than this value, it will respond with an error indication in the beacon completion sequence, since the pod is incompatible with the computer.

Figure 3C:
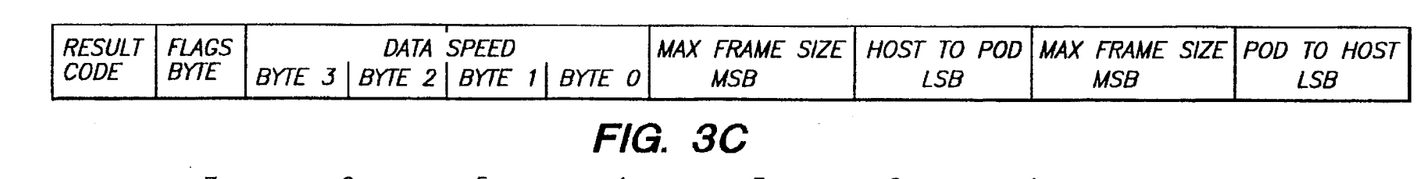
FIG. 3C is a diagram of a beacon completion signal sent by the communications device to the computer system.

The Maximum Frame Size parameters indicate the maximum size frame in bytes that the computer can support in each direction on the packetized interface. The pod will respond with the same parameters in its beacon completion sequence. If the pod can support this size or a larger size frame, it will respond with the same value. If the pod can only support a smaller size frame, it will respond with the smaller size. This negotiation of frame size at beacon time determines the maximum size that each side can support. The current frame size can be dynamically adjusted downward from the negotiated settings using a command defined on the packetized interface.

The Checksum of the beacon acknowledge sequence is calculated in the same manner as for the original beacon signal.

Figure 4:
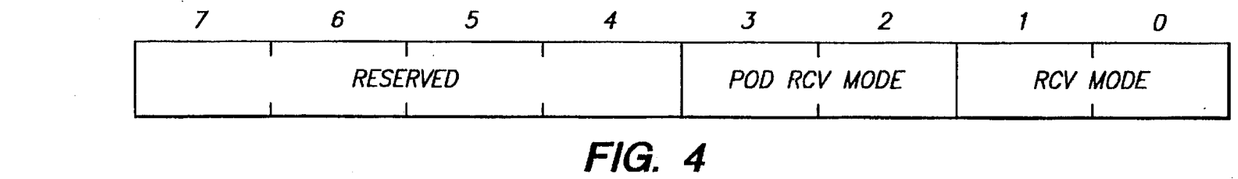
FIG. 4 is a diagram of the flags byte of the signals of FIGS. 3B and C.

Whether the computer and the pod will communicate in polled receive mode or DMA receive mode is determined in accordance with the contents of the Communication Flags Byte, the format of which is illustrated in FIG. 4. Two bits are used to indicate the receive mode of the host computer, and two bits are used to indicate the receive mode expected of the pod, as follows:

| Host Rcv Mode | |
|---|---|
| 00 | Host will operate in polled receive mode with length field |
| 01 | Host will operate in polled receive mode without length field |
| 10 | Host will operate in DMA receive mode |
| 11 | Host can operate in either polled or DMA receive mode |
| Pod Rcv Mode | |
| 00 | Pod is expected to operate in polled receive mode with length field |
| 01 | Pod is expected to operate in polled receive mode without length field |
| 10 | Pod is expected to operate in DMA receive mode |

| | |
|---|---|
| 11 | Pod can operate in either polled or DMA receive mode |
| Reserved | These bits are unused and should be ignored by the pod. |

After the pod has received the beacon acknowledge sequence, it sends to the computer a beacon completion sequence of a format illustrated in FIG. 3C. Note that the beacon completion sequence is of identical format as the beacon acknowledge sequence except that a Result Code replaces the Interface Type field. Pod frame size negotiation has been previously described. The pod can modify the receive mode in the beacon completion sequence only in certain cases. If either mode is specified as '11' ('either mode') in the beacon acknowledge sequence, the pod must make a determination as to which mode will be used and respond with the corresponding bits. Pods which can support both polled and DMA receive modes should favor DMA mode. Also, if either mode is specified as '01' ('with length'), it can be down graded to '00' ('without length') in the beacon completion sequence.

The result code indicates whether the pod is operating correctly at this point and whether the parameters indicated in the beacon acknowledge sequence can be supported by the pod. If the result code is negative, then an unrecoverable error has occurred. Either a pod self-test failed and the pod is inoperable, or one of the communication parameters is incompatible with the pod. The following result codes are defined:

| Result Code Symbol | Value | Description |
|---|---|---|
| noErr | 0 | No errors |
| kPrIncompSpeed | −1 | Pod does not support his low of a data rate |
| kPrIncompRcvMode | −2 | Pod does not support the indicated receive modes |

The Dam Speed indicates the actual pod clock speed that will be provided by the pod to the computer. The computer is then able to set certain timing parameters accordingly.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the invention as defined by the following claims.

What is claimed is:

1. In a system comprising a computer and an I/O device connected to the computer through a serial interface by a serial cable no more than a few feet in length, a method of identifying the I/O device, comprising the steps of:

in response to at least one of a power-up reset signal and a control signal from the computer, sending from the I/O device to the computer a beacon signal comprising a sequence of bytes identifying the I/O device; and in response to the beacon signal, determining within the computer a manner of interaction of the computer with the I/O device.

2. The method of claim 1 wherein the I/O device is a communications pod, and the beacon signal identifies a type of the communications pod from among possible types of communications pods including telephony and LAN telecommunications pods.

3. The method of claim 1 wherein the beacon signal is sent with asynchronous framing.

4. The method of claim 3 wherein the beacon signal is sent at a predetermined low speed.

5. The method of claim 3 wherein the beacon signal is sent to the computer in accordance with a clock signal provided to the computer from the I/O device.

6. The method of claim 1 wherein said control signal from the computer comprises a pulse on a hardware control line.

7. The method of claim 1 wherein said control signal comprises at least one byte of data sent from the computer to the I/O device.

8. The method of claim 1, comprising the further step of:

in response to the beacon signal, sending from the computer to the I/O device a beacon acknowledge signal identifying a type of the serial interface.

9. The method of claim 8, comprising the further step of:

in response to the beacon acknowledge signal, sending from the I/O device to the computer a beacon completion signal.

10. The method of claim 8, wherein the beacon acknowledge signal further includes configuration information.

11. The method of claim 10 wherein the beacon acknowledge signal indicates to the I/O device the maximum data speed that the computer can support.

12. The method of claim 10 wherein the beacon acknowledge signal indicates the maximum frame size, from I/O device to computer, that the computer can support.

13. The method of claim 10 wherein the beacon acknowledge signal indicates the maximum frame size, from computer to I/O device, that the computer can support.

14. The method of claim 10 wherein the beacon acknowledge signal indicates a computer receive mode from among possible receive modes including a polled receive mode and a DMA receive mode.

15. The method of claim 10 wherein the beacon acknowledge signal indicates an expected I/O device receive mode from among possible receive modes including a polled receive mode and a DMA receive mode.

16. The method of claim 8, comprising the further step of:

in response to the beacon acknowledge signal, sending from the I/O device to the computer a beacon completion signal indicating whether an error has occurred, including whether an incompatibility exists between the computer and the I/O device.

17. The method of claim 16 wherein the beacon completion signal indicates to the computer the actual data speed that the I/O device will use to send data to the computer.

18. The method of claim 16 wherein the beacon acknowledge signal further indicates a maximum frame size, from I/O device to computer, that both the I/O device and the computer can support.

19. The method of claim 16 wherein the beacon acknowledge signal further indicates the maximum frame size, from computer to I/O device, that both the I/O device and the computer can support.

* * * * *

(12) EX PARTE REEXAMINATION CERTIFICATE (8274th)
United States Patent
Devon et al.

(10) Number: US 5,634,074 C1
(45) Certificate Issued: May 31, 2011

(54) SERIAL I/O DEVICE IDENTIFIES ITSELF TO A COMPUTER THROUGH A SERIAL INTERFACE DURING POWER ON RESET THEN IT IS BEING CONFIGURED BY THE COMPUTER

(75) Inventors: Mark Devon, San Jose, CA (US); John Lynch, San Jose, CA (US); James B. Nichols, San Mateo, CA (US)

(73) Assignee: Apple Inc., Cupertino, CA (US)

Reexamination Request:
No. 90/010,964, Apr. 28, 2010

Reexamination Certificate for:
Patent No.: 5,634,074
Issued: May 27, 1997
Appl. No.: 08/059,598
Filed: May 7, 1993

(51) Int. Cl.
*G06F 15/16* (2006.01)
*G06F 15/177* (2006.01)
*G06F 13/38* (2006.01)
*G06F 9/445* (2006.01)

(52) U.S. Cl. .................. 710/8; 710/3; 710/9; 710/10; 710/105

(58) Field of Classification Search .................. 395/828
See application file for complete search history.

(56) References Cited

U.S. PATENT DOCUMENTS

| | | |
|---|---|---|
| 4,025,906 A | 5/1977 | Riikonen |
| 4,030,075 A | 6/1977 | Barlow |
| 4,318,182 A | 3/1982 | Bachman et al. |
| 4,504,927 A | 3/1985 | Callan |
| 4,509,113 A | 4/1985 | Heath |
| 4,660,141 A | 4/1987 | Ceccon et al. |
| 4,689,786 A | 8/1987 | Sidhu et al. |
| 4,750,136 A | 6/1988 | Arpin et al. |
| 4,773,005 A | 9/1988 | Sullivan |
| 4,787,028 A | 11/1988 | Finfrock et al. |

(Continued)

FOREIGN PATENT DOCUMENTS

| | | |
|---|---|---|
| EP | 0410314 | 1/1991 |
| EP | 0 494 032 A2 | 7/1992 |
| GB | 2255877 | 11/1992 |
| JP | 2113742 | 4/1990 |
| WO | WO 8701484 | 3/1987 |

OTHER PUBLICATIONS

International Search Report for International Application No. PCT/US94/04222, mailed Sep. 19, 1994, 2 pages.

Configuration Download from Host System, IBM Technical Disclosure Bulletin, vol. 30, No. 12, May 1988, New York, US, pp. 78–81.

Comer, Douglas E., Internetworking with TCP/IP vol. I, 1991, pp. 26–27, 80, 95 and 123–124.

Sippl, Charles J., et al., "Computer Dictionary," entry for "serial printer," Howard W. Sams & Co., Inc., 1974, p. 393.

Friend et al, "Understanding Data Communictions," Texas Instruments Incorporated, 1984, 98 pages.

Friend et al., Understanding Data Communications, 1984, $1^{st}$ Edition, 2d Pr. 1986, Howard W. Sams & Co., pp. 1–(6–7), 2–(18–26), 4–(3–22), 5–(1–20), 7–(10–25) and 8–(1–28), Radio Shack (Exhibit D).

*Primary Examiner*—Christina Y Leung (57) ABSTRACT

A self-configuring startup procedure for communications devices, including telecommunications adapters, provides unambiguous identification of the telecommunications adapter, or other communications device, connected to a serial port. The procedure does not interfere with the operation of other existing I/O devices that might be connected to the serial port, such as network, MIDI, or other serial I/O devices. The I/O device is connected to a computer through a serial interface and a serial link. When the I/O device exits a reset state, the I/O device sends across the serial link to the computer a "beacon" signal identifying the I/O device. In particular, during the beacon phase, the I/O device communicates identification and configuration parameters. Preferably, the beacon phase may be instigated by the computer using the same serial-link communications channel.

U.S. PATENT DOCUMENTS

| | | |
|---|---|---|
| 4,855,905 A | 8/1989 | Estrada et al. |
| 4,864,599 A | 9/1989 | Saegusa et al. |
| 5,031,091 A | 7/1991 | Wakatsuki et al. |
| 5,038,320 A | 8/1991 | Heath et al. |
| 5,131,081 A | 7/1992 | MacKenna et al. |
| 5,179,666 A | 1/1993 | Rimmer et al. |
| 5,195,085 A | 3/1993 | Bertsch et al. |
| 5,204,669 A | 4/1993 | Dorfe et al. |
| 5,226,040 A | 7/1993 | Noble, III et al. |
| 5,289,580 A | 2/1994 | Latif et al. |
| 5,291,585 A | 3/1994 | Sato et al. |
| 5,301,277 A | 4/1994 | Kanai |
| 5,361,336 A | 11/1994 | Atchison |
| 5,379,296 A | 1/1995 | Johnson et al. |
| 5,394,556 A | 2/1995 | Oprescu |
| 5,452,420 A | 9/1995 | Engdahl et al. |
| 5,457,784 A | 10/1995 | Wells et al. |
| 5,710,928 A | 1/1998 | Atkinson |

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-19 is confirmed.

* * * * *